United States Patent [19]
Lake

[11] 3,899,424
[45] Aug. 12, 1975

[54] DISPOSABLE AQUARIUM FILTER
[75] Inventor: John K. Lake, Van Nuys, Calif.
[73] Assignee: John P. Graff, Jr., Pasadena, Calif.; a part interest
[22] Filed: Dec. 3, 1973
[21] Appl. No.: 420,916

[52] U.S. Cl. .............. 210/169; 210/232; 210/437; 210/497.1
[51] Int. Cl. .............................. E04h 3/20
[58] Field of Search .......... 210/169, 282, 283, 284, 210/416, 437, 460, 483, 457, 458, 487, 210/490, 492 DIG. 5, 232, 497.1; 55/491

[56] References Cited
UNITED STATES PATENTS

| | | | |
|---|---|---|---|
| 2,182,501 | 12/1939 | Quare et al. ...................... | 55/491 |
| 2,293,051 | 8/1942 | Duffy ............................. | 210/416 X |
| 2,395,301 | 2/1946 | Sloan ............................. | 210/DIG. 5 |
| 2,463,929 | 3/1949 | West .............................. | 210/437 |
| 2,597,770 | 5/1952 | Alexander et al. ............... | 210/458 |
| 3,115,459 | 12/1963 | Giesse ............................ | 210/DIG. 5 |
| 3,255,889 | 6/1966 | Goldman et al. ................. | 210/457 |
| 3,319,790 | 5/1967 | Lindberg ......................... | 210/232 |
| 3,483,985 | 12/1969 | Axelrod .......................... | 210/169 |
| 3,543,940 | 12/1970 | Schmidt, Jr. ..................... | 210/490 |
| 3,643,801 | 2/1972 | Zelenko .......................... | 210/169 |
| 3,705,651 | 12/1972 | Klein ............................. | 210/282 |
| 3,785,494 | 1/1974 | Sama ............................. | 210/169 |

*Primary Examiner*—Theodore A. Granger
*Attorney, Agent, or Firm*—Mahoney, Schick & Cislo

[57] ABSTRACT

A disposal aquarium filter that is economically produced and having components such that degrees of filtration are possible which makes the filters of the invention desirable for filtering of water in aquariums. The structure prevents small or baby fish from the hazards normally encountered in aquarium filters; provides a surface upon which larger particles of food and the like may be adhered for ease of access to scavenger fish and provides a inner filtering medium and high aeration of surrounding water which has heretofore been only possible with expensive or complicated aquarium filters.

8 Claims, 6 Drawing Figures

PATENTED AUG 12 1975          3,899,424

DISPOSABLE AQUARIUM FILTER

BACKGROUND OF THE INVENTION

This invention pertains to filters for use in fish aquariums and the like. The filters of this invention are easily fabricated utilizing low cost materials which make the filters easily and readily disposable after they have served their useful life purposes. The filter element is such that a myriad of desirable features result from the unique design and components making up the filters of the invention.

The prior art has suggested various kinds and types of filters for use in aquariums. However, most of these filters require continued maintenance involving replacement of purifiers, washing of component parts and generally are undesirable because of their high cost and frequent need for replacement and/or maintenance. The prior art filters have employed activated charcoal or other types of chemical purifying ingredients, air filter stones, filter materials of one type or another, but all such filters have failed in one respect or another. Either the cost has been disproportionate to the function they are to perform or the complicated and sophisticated design of these filters has made maintenance necessary with all of its attendant, undesirable features such as, scrubbing, cleaning, washing or replacement of components.

The filters of this invention obviate the shortcomings of the prior art devices in that the filters are easily made, utilize low-cost materials and provide functions such as filtering, cleansing and aeration which has only been obtainable with much more expensive equipment and even then the expensive equipment would require messy cleaning or maintenance. In contradistinction, the features of the filters of this invention permit the purchaser thereof to dispose and replace the filter without difficulty.

OBJECTS AND SUMMARY OF THE INVENTION

It is an object of the invention to provide a disposable aquarium filter.

It is another object of the invention to provide a disposable aquarium filter which is easy to manufacture and of low cost.

It is still another object of this invention to provide an aquarium filter which performs a plurality of filtering functions.

It is still another and more important object of the invention to provide a disposable aquarium filter of the type wherein at least three separate filtering functions take place.

It is still another and further more important object of the invention to provide an aquarium filter of the type which is not detrimental to small fish or fish eggs, allows differential filtering of the aquarium water within which it is used and also provides for chemical purification of the aquarium water.

These and further objects of the invention will become apparent from reference to the accompanying drawing and the hereinafter following commentary.

Basically, the filters of this invention comprise a first tube adapted to be connected to an air supply source. A second tube of larger diameter than the first tube is juxtapositioned to the first tube and has an end about coterminus with the first tube wherein the lower portion of the second tube is provided with fluid passageways therethrough through which aquarium water may pass. A first layer of filter material encircles the lower portions of the first and second tubes while a second layer of filter material encircles the first layer which is positioned around the tubes. Granules of a chemical purifier are positioned at the interface between the first and second layers of filter materials and an outer layer of open mesh material encircles the second layer of filter material thereby making a unitary filter which performs all of the needed functions in an aquarium tank or the like.

Figure 1:
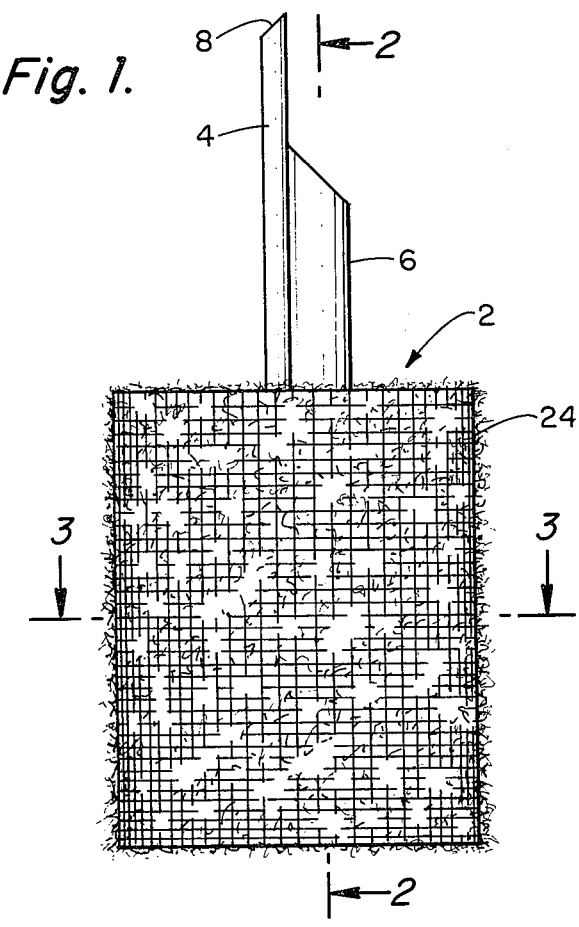
FIG. 1 is an elevational view of a filter in accordance with the teachings of the invention.

DESCRIPTION OF THE BEST EMBODIMENTS CONTEMPLATED:

Referring to the drawings wherein like elements of reference indicate like elements throughout the various figures, it will be seen that the disposable filter 2 of this invention comprises a first tube 4 having an end 8 which may be connected to an air supply source as is commonly found in aquariums. Positioned adjacent to the tube 4 is a larger diameter percolation tube 6, the lower ends of the tubes 4 and 6 being about coextensive. In the particular specific embodiment of the invention illustrated, it will be noted that the lower ends 10 and 12 of the tubes 4 and 6 respectively, are upwardly and angularly cut with respect to the longitudinal axes of the tubes 4 and 6 for better dispersal of water and air through the filter 2. Obviously, the end portions of tubes 4 and 6 may be cut other than as shown with little detriment to the action of filter 2.

Figure 2:
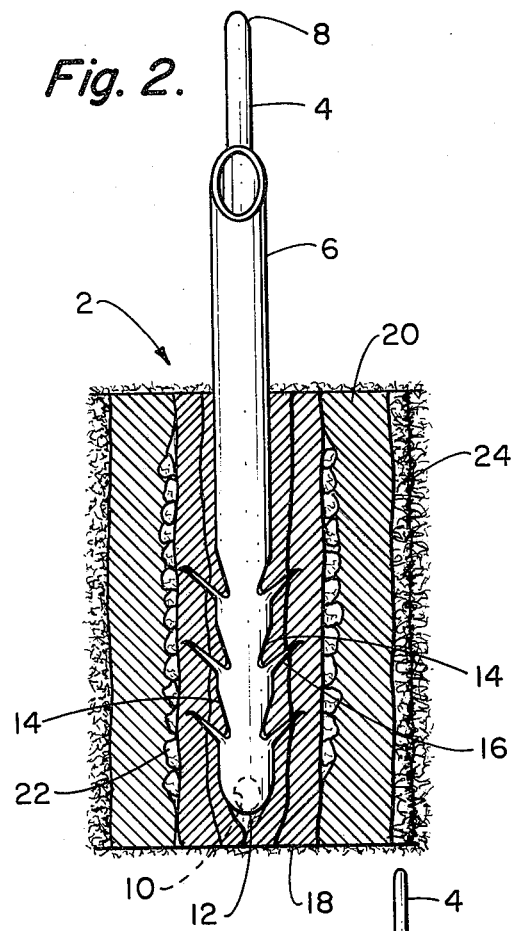
FIG. 2 is a view taken along the line 2—2 of FIG. 1.

In this instance, the tubes 4 and 6 are rigidly secured to each other by means of an adhesive or where, for example, in this case the tubes 4 and 6 are fabricated of molded plastic, they may be electronically welded or the like, and quite obviously, as will be seen the tubes need not be rigidly secured but in the preferred form are secured. The lower portion of the percolater tube 6 is provided with fluid passageways 14 which are formed by wall portions 16 being angularly and upwardly displaced with respect to the longitudinal axis of percolater tube 6 as seen in FIGS. 2 and 4.

Figure 3:
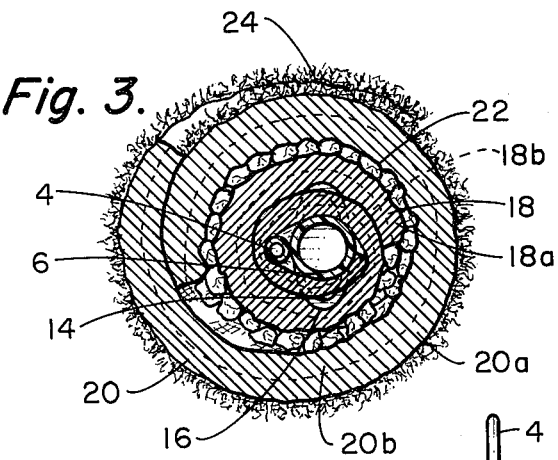
FIG. 3 is a view taken along the line 3—3 of FIG. 2.
Figure 4:
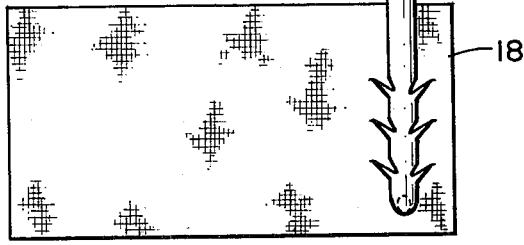
FIGS. 4, 5 and 6 illustrate the manner in which a disposable aquarium filter of the invention is fabricated.
Figure 5:
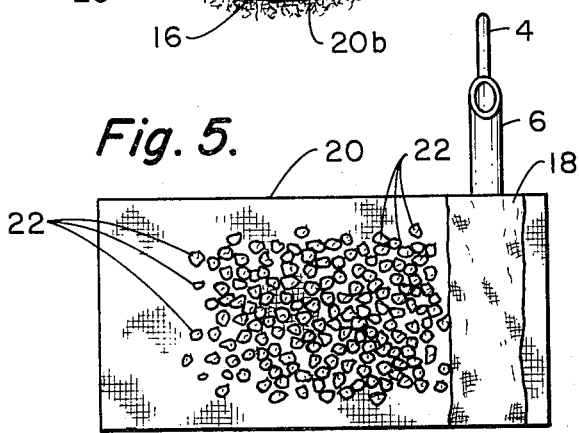
Figure 6:
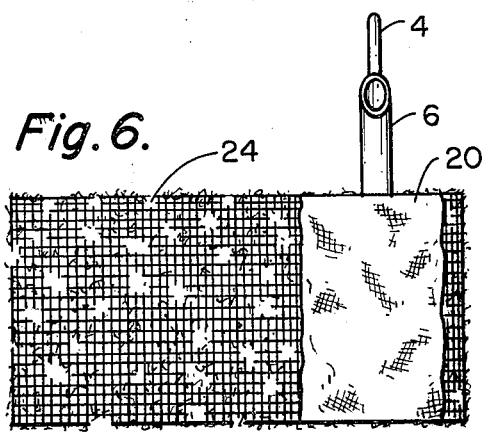

The disposable aquarium filters of the invention will be more readily understood by referring to FIGS. 4, 5 and 6. Referring to FIG. 4, it will be noted that the assembled or secured tubes 4 and 6 are laid upon a length of first filter material 18. The layer 18 is shown as rectangularly shaped but may be of any size so long as it may be formed into a cylindrical shape as seen in FIGS. 3 and 5. The first filter layer 18 may be any of the known filter materials such as Dacron wool or other synthetic or natural fibers which have a natural coherency when spun into finished form. The conventionally found filter material for use in conjunction with hot air furnaces, etc., has been found to be satisfactory for the disposable aquarium filters of this invention.

The filter layer 18, as most conventionally found, has a laminate structure wherein the outer layer 18a is of greater density or of less porosity than the inner layer of the laminate 18b (see FIG. 3). Upon placement of the secured tubes 4 and 6 on the first filter layer 18, the wall sections 16 of the lower portion of percolater tube 6 provide means whereby a mechanical attachment is provided at least for the first portion of the filter material layer 18 upon winding the layer 18 about the lower portion of the tubes 4 and 6. The layer 18 is tightly or closely wound about the lower portions of tubes 4 and 6 as can be seen in FIG. 3. Obviously, it is possible, and in some cases will be preferable, to mold in known manners a cylindrical body of filter material about the lower end portions of 4 and 6 as opposed to using the rectangular segment of the filter material 18 wound about the bottom of the tubes 4 and 6 previously described.

Upon winding of the first filter material 18, it will be found that the filter material has a tendency to adhere to adjacent layers to perform a discreet cylindrical form as illustrated in FIG. 5. A second layer of filter material 20 is placed for example on a flat surface having the approximate shape of the first layer 18 and being made of the same types of materials as discussed above for layer 18. Again, the layer 20 is preferably formed in laminate configuration with the more dense or less porous portion facing exteriorly of the center or central portion of the filter 2. Thus, layer 20a is more coarse than layer 20b as illustrated in FIG. 3.

Upon placement of the second layer 20 in readying position to receive the wound first filter layer 18, an amount of chemical filtering material for example, charcoal granules 22 are disposed on the upper surface of second filter layer 20. The tubes with the first wound layer 18 is then more loosely wound into a cylinder shape as seen in FIGS. 3 and 6. The charcoal granules 22 become embedded within the fibers of the first and second layers of filter material 18 and 20 respectively and the layers 18 and 20 have a tendency to naturally adhere to one another because of the interplay between individual fibers making up the layers 18 and 20.

Other chemical purifiers of course may be substituted for either the carbon or activated charcoal particles 22 as illustrated in FIGS. 3 and 5. Referring now to FIG. 6, another open mesh or coarse outer layer 24 of about the same size and shape as layers 18 and 20 is positioned so that the wound layers of filter material may be placed thereon and the layer 24 rolled upon itself into a formed cylindrical shape as seen in FIG. 3. The layer 24 is of mesh or netlike open cell material and may be secured to itself once the final filter 2 has been formed as seen in FIG. 1. Where the open mesh material is made of synthetics, electronic welding, or in the preferred case, spots of water in soluble adhesive or glue may be utilized, to form a finished filter 2.

Obviously, the second layer 20 may be molded about the first formed layer 18 as previously disclosed for formed layer 18. In such instance, the porosity of a molded layer 20 for example, should be greater than the porosity of a molded layer 18 encircling the tubes 4 and 6. Thus, referring to FIG. 2, it will be seen that the open mesh layer 24 forms a high porosity filter medium forming interstices within which larger particles may be entrained for easy access to scavenger fish and the like. The next more dense layer 20 provides additional filtering along with the granules of, for example, activated carbon, at about the interface between the second filter layer 20 and the first filter layer 18.

The porosity of the filter 2 decreases from the external surface towards the interior of filter 2 adjacent the percolator tube 6.

In use, referring to FIG. 2, it will be apparent that the end 8 of air tube 4 is connected to an air pump and the exiting air at the bottom thereof will create an aeration and filtering effect wherein water is drawn through the filter 2 for filtering and purification and small bubbles of air are imparted to the surrounding air in a quiet and efficient manner. The wall portions 16 aid in the filtering and aeration process.

While the invention has been described in the specific form, various changes and modifications will make themselves known to those of skill in the art. For example, various sized filters may be fabricated in accordance with the teachings of the invention depending upon the size of the aquarium in which the filters of the invention are to be used. Additionally, while specific materials have been illustrated, others will readily suggest themselves and while it is preferred that the filter layers 18 and 20, as well as the external mesh layer 24, be somewhat self-supporting other more limp or mechanically weaker materials will indeed be possible taking care that the principles of the invention are followed.

Other modifications and changes will present themselves and all of which will not be depart from the spirit and scope of the invention as defined in the appended claims.

I claim:

1. A disposable aquarium filter comprising the combination of: a first tube adapted to be connected to an air supply source; a second tube of larger diameter than said first tube, the lower ends of said first and second tube being about coterminus, the lower portions of said second tube having fluid passageways therethrough; a first continuous layer of filter material wound about and encircling the lower portions of said first and second tubes; a second continuous layer of filter material wound about and encircling said first layer of filter material and said tubes; granules of a chemical purifier at the interface between said first and second layers of filter materials; and an outer continuous layer of open mesh material wound about and encircling said second layer of filter material, said fluid passageways being formed by extending, displaced tube wall portions of said second tube which protrude into said first continuous layer of filter material to form a mechanical connection therebetween.

2. A disposable aquarium filter comprising the combination of: a first tube adapted to be connected to an air supply source; a second tube of larger diameter than said first tube, the lower ends of said first and second tubes being about coterminus, the lower portions of said second tube having fluid passageways therethrough; a first layer of filter material tightly wound about and encircling the lower portions of said first and second tubes; a second layer of filter material loosely wound, relative to said first layer of filter material and encircling said first layer of filter material and said tubes; granules of charcoal at the interface between said first and second layers of filter material; and an outer layer of open mesh material encircling said second layer of filter material comprising fibers of a spun synthetic plastic, a laminate construction having varying densities and wherein each of said layers of filter material has a descreasing porosity from the outside of each of said layers inwardly of the exterior thereof, the terminal portions of said tubes terminating upwardly and angularly with respect to the longitudinal axis of said tubes, said fluid passageways in said second tube being formed by extending, displaced tube wall portions of said second tube, said displaced wall portions being angularly disposed with respect to the longitudinal axis of said second tube to form a plurality of extending securement means whereby said securement means protrude into said first layer of filter material to provide a mechanical attachment therefore.

3. A disposable aquarium filter as defined in claim 2 wherein said first and second tubes are rigidly secured to one another.

4. A disposable aquarium filter comprising a first tube adapted to be connected to an air supply source; a second larger tube, the lower end of said first and larger tubes being approximately coterminus; said tubes being juxtaposed with respect to each other; a spun fibrous filter element wound closely about said tubes; a plurality of spaced openings in the side wall of said larger tube enclosed by said filter element; a plurality of tapered projections adjacent to and below said openings, said projections extending outwardly and upwardly from said wall; said projections penetrating said filter element to an extent sufficient to obtain a mechanical connection between said filter element and said larger tube.

5. A disposable aquarium filter as defined in claim 4 wherein the material of said filter element is a spun synthetic plastic.

6. A disposable aquarium filter as defined in claim 5 wherein the terminal portions of said tubes terminate upwardly and angularly with respect to the longitudinal axis of said tubes.

7. A disposable aquarium filter in accordance with claim 4 in which said tubes are formed of molded plastic and are secured to each other.

8. A disposable aquarium filter as defined in claim 7 wherein said openings and projections in said larger tube are formed by cut out wall portions thereof, said cut out wall portions being angularly disposed with respect to the longitudinal axis of said larger tube form a mechanical attachment to said filter element.

* * * * *